US010219310B2

(12) United States Patent
Kanugovi et al.

(10) Patent No.: US 10,219,310 B2
(45) Date of Patent: Feb. 26, 2019

(54) WIFI BOOST WITH LTE IP ANCHOR

(71) Applicants: Satish Kanugovi, Bangalore (IN); Subramanian Vasudevan, Morristown, NJ (US)

(72) Inventors: Satish Kanugovi, Bangalore (IN); Subramanian Vasudevan, Morristown, NJ (US)

(73) Assignee: ALCATEL LUCENT, Boulogne-Billancourt (FR)

( * ) Notice: Subject to any disclaimer, the term of this patent is extended or adjusted under 35 U.S.C. 154(b) by 158 days.

(21) Appl. No.: 14/569,091

(22) Filed: Dec. 12, 2014

(65) Prior Publication Data

US 2016/0174107 A1   Jun. 16, 2016

(51) Int. Cl.
*H04W 28/02*   (2009.01)
*H04W 76/15*   (2018.01)
(Continued)

(52) U.S. Cl.
CPC ............ *H04W 76/15* (2018.02); *H04L 12/28* (2013.01); *H04W 28/0247* (2013.01); *H04W 28/08* (2013.01); *H04W 28/12* (2013.01); *H04W 72/085* (2013.01); *H04W 36/0027* (2013.01); *H04W 76/12* (2018.02); *H04W 84/12* (2013.01);
(Continued)

(58) Field of Classification Search
CPC ............... H04W 36/22; H04W 72/085; H04W 28/0247; H04W 28/08
See application file for complete search history.

(56) References Cited

U.S. PATENT DOCUMENTS

| 9,392,519 B2 | 7/2016 | Zhu | |
|---|---|---|---|
| 2008/0130637 A1* | 6/2008 | Kant | H04W 8/087 |
| | | | 370/389 |

(Continued)

FOREIGN PATENT DOCUMENTS

| EP | 2811779 A1 | 12/2014 |
|---|---|---|
| JP | 2013-520096 A | 5/2013 |

(Continued)

OTHER PUBLICATIONS

Ling et al., "Enhanced Capacity & Coverage by Wi-Fi LTE Integration", <http://arxiv.org/ftp/arxiv/papers/1406/1406.3147>, pp. 1-6, Jun. 12, 2014.

(Continued)

*Primary Examiner* — Omer S Mian
(74) *Attorney, Agent, or Firm* — Harness, Dickey & Pierce, P.L.C.

(57) ABSTRACT

A radio access network element includes a base station configured to: allocate, based on received radio link measurement information, at least a first portion of downlink packet data convergence protocol (PDCP) packets received at the base station for delivery to a user equipment over a wireless local area network (WLAN) link between a WLAN access point and the user equipment, the received radio link measurement information being indicative of at least one of a WLAN link quality and a loading of the WLAN link; and output the first portion of the received downlink PDCP packets to the WLAN access point for delivery to the user equipment over the WLAN link.

13 Claims, 10 Drawing Sheets

(51) Int. Cl.
*H04W 72/08* (2009.01)
*H04L 12/28* (2006.01)
*H04W 28/08* (2009.01)
*H04W 28/12* (2009.01)
*H04W 76/12* (2018.01)
*H04W 88/16* (2009.01)
*H04W 88/12* (2009.01)
*H04W 88/08* (2009.01)
*H04W 84/12* (2009.01)
*H04W 36/00* (2009.01)

(52) U.S. Cl.
CPC ............ *H04W 88/08* (2013.01); *H04W 88/12* (2013.01); *H04W 88/16* (2013.01)

(56) References Cited

U.S. PATENT DOCUMENTS

| | | |
|---|---|---|
| 2013/0003697 A1 | 1/2013 | Adjakple et al. |
| 2014/0078906 A1 | 3/2014 | Chen et al. |
| 2014/0079022 A1 | 3/2014 | Wang et al. |
| 2014/0082697 A1 | 3/2014 | Watfa et al. |
| 2014/0133298 A1 | 5/2014 | Han et al. |
| 2014/0341182 A1 | 11/2014 | Gage et al. |
| 2015/0029956 A1 | 1/2015 | Moses et al. |
| 2015/0029973 A1 | 1/2015 | Vesterinen et al. |
| 2015/0049707 A1* | 2/2015 | Vajapeyam ............ H04W 24/10 370/329 |
| 2015/0139184 A1 | 5/2015 | Wang et al. |
| 2015/0208310 A1* | 7/2015 | Taneja .............. H04W 36/0066 370/331 |
| 2016/0044567 A1 | 2/2016 | Baghel et al. |
| 2016/0088542 A1* | 3/2016 | Belghoul .............. H04W 36/22 370/331 |
| 2016/0095037 A1* | 3/2016 | Morita ................. H04W 12/06 370/331 |
| 2016/0119939 A1* | 4/2016 | Himayat ........... H04W 28/0278 370/329 |
| 2016/0128110 A1* | 5/2016 | Sirotkin .............. H04W 76/022 370/329 |
| 2016/0192266 A1 | 6/2016 | Dai et al. |
| 2016/0234851 A1* | 8/2016 | Zhang .................... H04W 28/08 |
| 2016/0269355 A1 | 9/2016 | Lee et al. |
| 2016/0277974 A1 | 9/2016 | Persson et al. |

FOREIGN PATENT DOCUMENTS

| | | |
|---|---|---|
| JP | 2014-216818 A | 11/2014 |
| WO | WO-2014047939 A1 | 4/2014 |

OTHER PUBLICATIONS

Kyocera Corp., "Multi-RAT Joint Coordination Involving WLAN", R3-140758, 3rd Generation Partnership Project, vol. RAN WG3, <http://www.3gpp.org/ftp/meetings_3gpp_sync/ran3/docs>, Mar. 30, 2014.

Broadcom Corporation, "WLAC—3GPP Interworking, Assumptions and Impact on Terminal and Core Network", 3rd Generation Partnership Project ,vol. SA WG2, <http://www.3gpp.org/ftp/meetings_3gpp_sync/sa2/docs>, Mar. 23, 2014.

International Search Report and Written Opinion of the International Searching Authority dated Mar. 2, 2016, in PCT Application No. PCT/IB2015/002262.

International Search Report and Written Opinion of the International Searching Authority dated Mar. 2, 2016, in PCT Application No. PCT/IB2015/002260.

* cited by examiner

WIFI BOOST WITH LTE IP ANCHOR

BACKGROUND

In general, cellular systems using licensed spectrum (e.g., $3^{rd}$ Generation Partnership Project (3GPP) Long Term Evolution (LTE) systems) and wireless local area networks (WLANs) using unlicensed bands of spectrum (e.g., Wireless Fidelity (WiFi) or other local access) are used for providing wireless services in a complementary manner. Cellular systems generally provide macro cellular coverage outdoors and with some in-building reach, whereas WLANs generally serve enterprises, residences, public venues, and the like.

SUMMARY

WiFi Boost is a family of schemes for integration of WiFi and cellular (e.g., $3^{rd}$ Generation Partnership Project (3GPP) Long-Term Evolution (LTE)) radio accesses that increases WiFi capacity and coverage by offloading uplink transmissions to cellular links and/or downlink transmissions to WiFi links. At least some example embodiments do not require changes to WiFi infrastructure and piggybacks on existing WiFi standards and deployment.

At least some example embodiments of LTE-WiFi integration may provide additional capacity of WiFi to LTE, and may also enhance WiFi performance and/or application experience. At least some example embodiments may also ensure more predictable and controlled WiFi performance.

Example embodiments may be described in the context of, for example, LTE and WiFi integration. However, example embodiments may be extended to systems in which WiFi (or other contention-based wireless technology) is integrated with LTE or other data transport technologies like Wideband Code Division Multiple Access (WCDMA), High Speed Packet Access (HSPA), Code Division Multiple Access (CDMA), Evolution-data optimized (EVDO) radio access technology, high-speed downlink packet access (HSPDA), HSPDA+, worldwide interoperability for microwave access (WiMAX), etc.

According to one or more example embodiments, the aggregation of cellular and WiFi systems is accomplished in a scenario in which the public Internet Protocol (IP) address used by the application at the user equipment (UE), which leverages both the cellular and WiFi interfaces concurrently and/or simultaneously to connect to an application server, is obtained from the cellular association. For the integrated cellular-WiFi mode of operation, the multi-mode UE communicates with the WiFi AP with a riations areaddress, that is provided by a WLAN (or WiFi) router, and that is local to the WLAN provided by the WLAN router. The UE may, independent of the described LTE-WiFi aggregated mode of operation, support data connection via the WLAN router to the Internet Service Provider (ISP) as a WiFi only connection and/or with the LTE network in a LTE-only mode.

According to at least one example embodiment, a radio access network element including a base station configured to: allocate, based on received radio link measurement information, at least a first portion of downlink packet data convergence protocol (PDCP) packets received at the base station for delivery to a user equipment over a wireless local area network (WLAN) link between a WLAN access point and the user equipment, the received radio link measurement information being indicative of at least one of a WLAN link quality and a loading of the WLAN link; and output the first portion of the received downlink PDCP packets to the WLAN access point for delivery to the user equipment over the WLAN link.

At least one other example embodiment provides a radio access network element including a base station configured to: allocate, based on received radio link measurement information, at least a first portion of downlink PDCP packets received at the base station for delivery to a user equipment over a WLAN link between a WLAN access point and the user equipment, the received radio link measurement information being indicative of at least one of a WLAN link quality and a loading on the WLAN link; and output the first portion of the downlink PDCP packets to a WLAN gateway over a General Packet Radio Service (GPRS) tunneling protocol (GTP) tunnel between the base station and the WLAN gateway for delivery to the user equipment over the WLAN link.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

Figure 1:
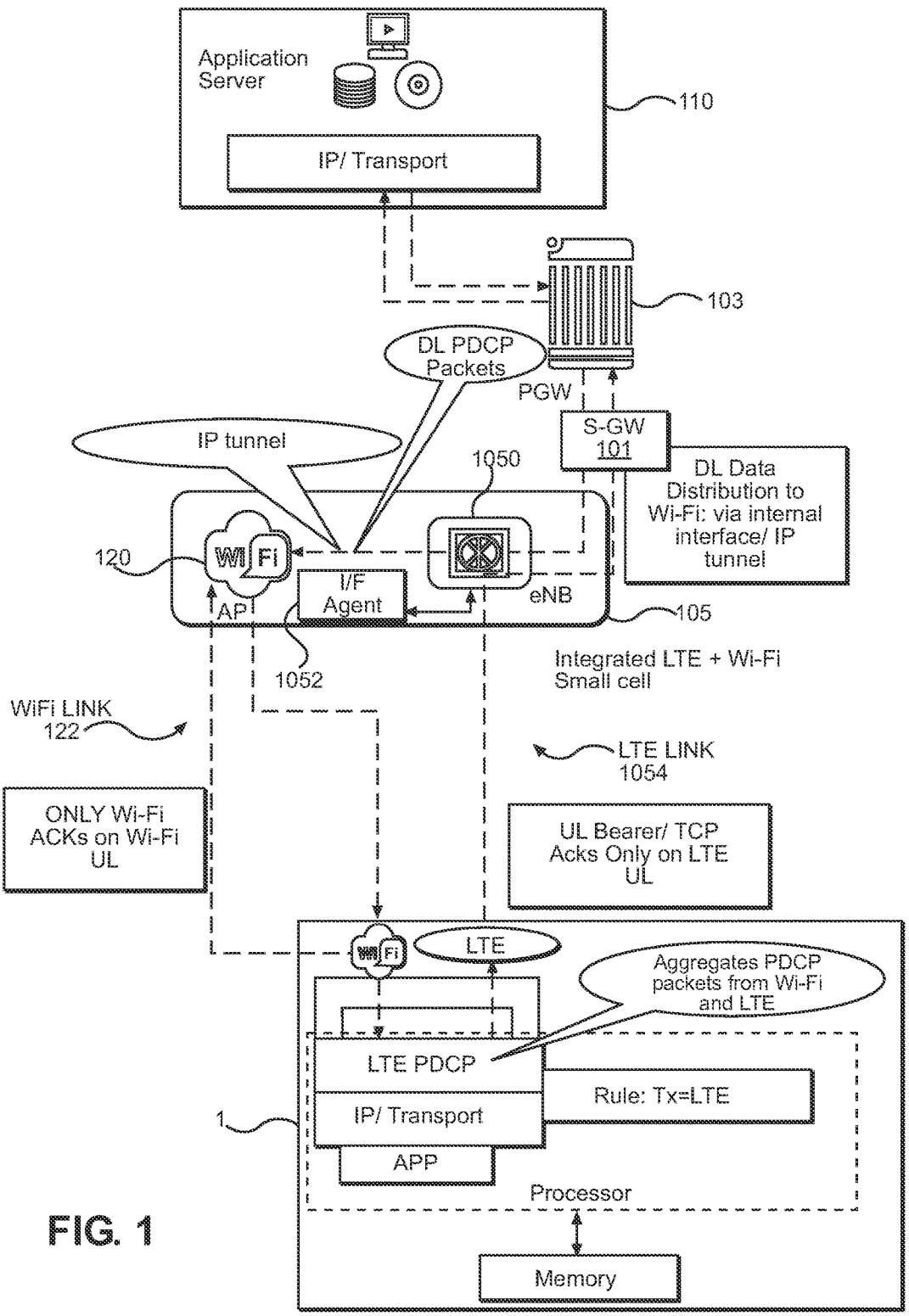
FIG. 1 illustrates an example embodiment of a communication system having integrated cellular and WiFi systems.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at, for example, existing small wireless cells, base stations, NodeBs, gateways, servers, wireless, WiFi or wireless local area network (WLAN) access points, wireless routers, WLAN gateways, user equipments (UEs) including dual-mode UEs, etc. Such existing hardware may include one or more Central Processing Units (CPUs), system-on-chip (SOC) devices, digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium", "computer readable storage medium" or "non-transitory computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "eNodeB" or "eNB" may be considered synonymous to, and may hereafter be occasionally referred to as a NodeB, base station, transceiver station, base transceiver station (BTS), macro cell, etc., and describes a transceiver in communication with and providing wireless resources to users in a geographical coverage area. As discussed herein, eNBs may have all functionally associated with conventional, well-known base stations in addition to the capability and functionality discussed herein.

As used herein, the term "small wireless cell" may be considered synonymous to, and may hereafter be occasionally referred to as a micro cell, pico cell, Home NodeB (HNB), Home eNodeB (HeNB), etc., and describes a transceiver in communication with and providing wireless resources (e.g., LTE, 3G, WiFi, etc.) to users in a geographical coverage area that is, in most cases, smaller than the geographical coverage area covered by a macro cell. As discussed herein, small wireless cells may have all functionally associated with conventional, well-known base stations in addition to the capability and functionality discussed herein. In this regard, the small wireless cells may include a base station or eNB (or eNB module). Small wireless cells according to at least some example embodiments may also serve as WLAN (or WiFi) access points (APs) providing WLAN (or WiFi) resources for devices within range of the small wireless cell. Small wireless cells according to example embodiments will be discussed in more detail later.

The term "user equipment" or "UE" as discussed herein, may be considered synonymous to, and may hereafter be occasionally referred to, as user, client, client device, mobile unit, mobile station, mobile user, mobile, subscriber, user, remote station, access terminal, receiver, etc., and describes a remote user of wireless resources in a wireless communication network (e.g., a 3GPP LTE network) and/or a WLAN. The UEs discussed herein may also be referred to as multi-mode UEs capable of communicating over at least LTE and WiFi.

As discussed herein, a WiFi access point (WiFi AP) may be considered synonymous to, and may hereinafter be occasionally referred to as a wireless access point, wireless router, wireless local area network (WLAN) access point, etc., and describes a transceiver in communication with, and providing WiFi resources for, client devices in range of, and attached to, the WiFi AP. The WiFi AP allows wireless client devices (e.g., electronic devices having a WiFi transceiver) to connect to other (e.g., wireless and/or wired) networks, such as the Internet.

Generally, as discussed herein, a WiFi AP may be any well-known wireless access point, router, or other physical computer hardware system, including one or more processors, various communication interfaces (e.g., both wireless and wired), a computer readable medium, etc. The one or more interfaces may be configured to transmit/receive data signals via a wireless connection over a WLAN to/from one or more other devices, and also communicate with the Internet, for example over a wired connection.

Generally, as discussed herein, a small wireless cell may be any well-known small wireless cell including one or more processors, various communication interfaces (e.g., LTE, WiFi and wired), a computer readable medium, memories, etc. The one or more interfaces may be configured to transmit/receive data signals via wireless connections over a WiFi and a cellular network to/from one or more other devices, and also communicate with the Internet, for example over a wired connection.

According to example embodiments, packet data network (PDN) gateways (P-GW), serving gateways (S-GW), UEs, application/proxy servers, small wireless cells, eNBs, wireless access points (APs), WiFi APs, wireless routers, servers, WLAN gateways, Evolved Packet Data Gateways (ePDGs), a GTP proxy, an Interface Agent (or proxy), etc. may be (or include) hardware, firmware, hardware executing software or any combination thereof. Such hardware may include one or more Central Processing Units (CPUs), system-on-chip (SOC) devices, digital signal processors (DSPs), application-specific-integrated-circuits (ASICs), field programmable gate arrays (FPGAs), computers or the like configured as special purpose machines to perform the functions described herein as well as any other well-known functions of these elements. In at least some cases, CPUs, SOCs, DSPs, ASICs and FPGAs may generally be referred to as processing circuits, processors and/or microprocessors.

FIG. 1 illustrates an example embodiment of a communication system having integrated LTE and WiFi systems.

Example embodiments will be described herein in the context of LTE and WiFi integration. However, example embodiments may be extended to systems in which WiFi (or other contention-based wireless technology) is integrated with LTE or other data transport technologies, such as Wideband Code Division Multiple Access (WCDMA), High Speed Packet Access (HSPA), Code Division Multiple Access (CDMA), Evolution-data optimized (EVDO) radio access technology, high-speed downlink packet access (HSPDA), HSPDA+, worldwide interoperability for microwave access (WiMAX), etc.

Referring to FIG. 1, the communication system includes an application or proxy server (referred to herein as an application server) 110; a packet data network (PDN) gateway (PGW) 103; a serving gateway (SGW) 101; and a small wireless cell 105.

The application server 110 may be a web server that hosts multimedia content (e.g., voice, video, etc.). In another example, the application server 110 may be a Voice over Internet Protocol (VoIP) server providing VoIP services to users in the network, a web server, an instant messaging server, an email server, a software and/or cloud server, or any other Internet Protocol (IP)-based service deliverable to a mobile user equipment or other device using 3GPP access and/or non-3GPP access (e.g., WLAN, WiFi, etc.). In this regard, downlink bearer traffic (or downlink packets) may include a webpage, a video, an email, an instant message, one direction of a VoIP call, one direction of a video call, or the like, which originates at the application server 110, and is sent to the small wireless cell 105 via the Internet. Uplink bearer traffic may include a request for a webpage, a request for a video, an email, an instant message, one direction of a VoIP call, one direction of a video call, upload of a video, or the like.

The PGW 103 serves as an interface between an IP Packet Data Network (IP-PDN) and an IP Connectivity Access Network (IP-CAN). The PGW 103 is responsible for IP address allocation for UEs, as well as Quality of Service (QoS) enforcement and flow-based charging according to rules from a Policy Control and Charging Rules Function (PCRF). The PGW 103 is operatively connected to the SGW 101 over the S5/S8 interface. The SGW 101 is also operatively connected to the small wireless cell 105 over the S1-U interface.

The SGW 101 provides a connection between the small wireless cell 105 and the PGW 103 by storing a current one-to-one mapping between Evolved Packet System (EPS) bearers carried over the S1-U interface (between the SGW 101 and the small wireless cell 105) and the S5/S8 interface. The SGW 101 serves as the gateway between the evolved Universal Mobile Telecommunications System (UMTS) Terrestrial Radio Access Network (EUTRAN) and the Evolved Packet Core (EPC).

Still referring to FIG. 1, the small wireless cell 105 includes an integrated eNB 1050 (also referred to as a base station or base station module) and a WiFi access point (AP) 120, as well as an Interface Agent module 1052 (also referred to herein as an interface agent processor). The Interface Agent (or module) may also be referred to as the Interface Agent unit or Interface Agent circuit.

The eNB 1050 provides wireless resources and radio coverage for UEs in the cellular coverage area of the small wireless cell 105. According to one or more example embodiments, the eNB 1050 may provide wideband radio frequency resources (e.g., 3GPP-LTE, and the like), and may be based on either Frequency Division Duplexing (FDD) or Time Division Duplexing (TDD). The eNB 1050 may also be based on scheduled access for user data such that the cellular links between the eNB 1050 are understood to be scheduled, contentionless links (i.e., all downlink and uplink user plane transmissions for UEs via the cellular links are scheduled by the integrated eNB 1050. The eNB 1050 may be configured to communicate using existing procedures for use by wireless cells (e.g., a macro cell, micro cell, pico cell, eNodeB, eNB, HeNB, etc.) to communicate via a LTE air interface.

As mentioned above, the small wireless cell 105 further includes an Interface Agent 1052. The Interface Agent may maintain mapping between the UE's, LTE session and Wi-Fi link identifier (e.g., UE's Wi-Fi IP address), and routes packets determined to be delivered over the Wi-Fi link via the WLAN AP 120. The Interface Agent 1052 provides the "glue" between the PDCP layer in the LTE protocol stack at the eNB 1050 and the WiFi AP 120. The Interface Agent 1052 provides the appropriate path/route for downlink PDCP packets to be delivered from the eNB 1050 to the UE 1 by the WiFi AP 120 over the WiFi link 122.

In another example embodiment, the Interface Agent 1052 secures data transmission with the UE 1 served over the WiFi link 122 via the WiFi AP 120. The eNB 1050 establishes an IP tunnel with the UE 1 by the Wi-Fi AP 120, since the WiFi AP 120 is considered untrusted by the eNB 1050, as defined in the 3GPP standards. For this purpose, the Interface Agent 1052 acts as a termination node for IPsec tunnels established with the UE 1.

In another example embodiment, the Interface Agent 1052 receives uplink packets sent from the WiFi AP 120, and forwards the received uplink packets to the PDCP module of the appropriate UE session at the eNB 1050.

The WiFi AP 120 at the small wireless cell 105 provides WiFi resources for UEs in the WiFi coverage area of the small wireless cell 105. As is known, WiFi resources are time-shared channel resources that use a polite access protocol (e.g., Carrier Sense Multiple Access (CSMA)). According to the CSMA mechanism, each potential transmitter, including the WiFi AP 120 and UEs, vie for use of the channel for both uplink and downlink transmissions and defers transmission until the channel is deemed to be clear.

At the small wireless cell 105, the eNB 1050 is communicatively connected to the WiFi AP 120 through an IP tunnel between the eNB 1050 and the WiFi AP 120. In this example, the eNB 1050 tunnels PDCP packets destined for the UE 1 over to the WiFi AP 120 through the local IP tunnel, and the WiFi AP 120 delivers the received PDCP packets to the UE 1 via the WiFi link 122. In this regard, downlink IP traffic may be off-loaded from the LTE network (or link) to the WiFi network (or link), thereby boosting throughput to the UE 1.

Still referring to FIG. 1, the UE 1 is a multi-mode user device that supports both LTE-based and WiFi-based communications. For example, the UE 1 may be a smartphone, a tablet computer, a laptop, a personal digital assistant (PDA), or the like. The UE 1 may include: a processor; a memory; LTE interface; and WiFi interface. The processor is communicatively connected to each of the memory, the LTE interface, and the WiFi interface. The memory stores programs that may be executed by the processor to provide various functions of the LTE-WLAN integration capability discussed herein. The memory also stores data usable to provide, or generated as a result of, execution of various functions of the LTE-WLAN integration capability discussed herein. It will be appreciated that the implementation of UE 1 depicted in FIG. 1 is merely an example, and that UE 1 may be implemented in any other manner suitable for providing functions of the LTE-WLAN integration capability.

Once connected to the WiFi AP 120 through the local IP tunnel, the eNB 1050 obtains the private (or local) IP address assigned to the UE 1 by the WiFi AP 120. Using the obtained local IP address assigned to the UE 1, the eNB 1050 tunnels downlink PDCP packets destined for the UE 1 via the WiFi AP 120 through the local IP tunnel, and the WiFi AP 120 delivers the received PDCP packets to the UE 1 via the WiFi downlink.

In another example embodiment, using the obtained local IP address assigned to the UE 1, the eNB 1050 establishes an IPSec tunnel with the UE 1 and delivers the downlink PDCP packets over the secure IPSec tunnel. When IPSec tunnel is used, the downlink PDCP packets are encrypted and encapsulated by IPSec procedures and delivered to WiFi AP 120 over the local IP tunnel, and the WiFi AP 120 delivers the received PDCP packets to the UE 1 via the WiFi downlink. Accordingly, downlink IP traffic may be off-loaded from the LTE network (or link) to the WiFi network (or link), thereby boosting overall network capacity and/or throughput served to the UE 1. According to at least some example embodiments, the UE 1 may transmit uplink traffic (e.g., including WiFi acknowledgement (ACK) messages) to the WiFi AP 120 on the WiFi link 122. The UE 1 may also transmit uplink bearer traffic as well as transport control protocol acknowledgements (TCP ACKs) on the uplink portion of the LTE link 1054. In at least one example embodiment, the UE 1 transmits only WiFi acknowledgement (ACK) messages to the WiFi AP 120 over the WiFi uplink, and the UE 1 transmits uplink bearer traffic and TCP ACKs only over the LTE uplink.

Figure 3:
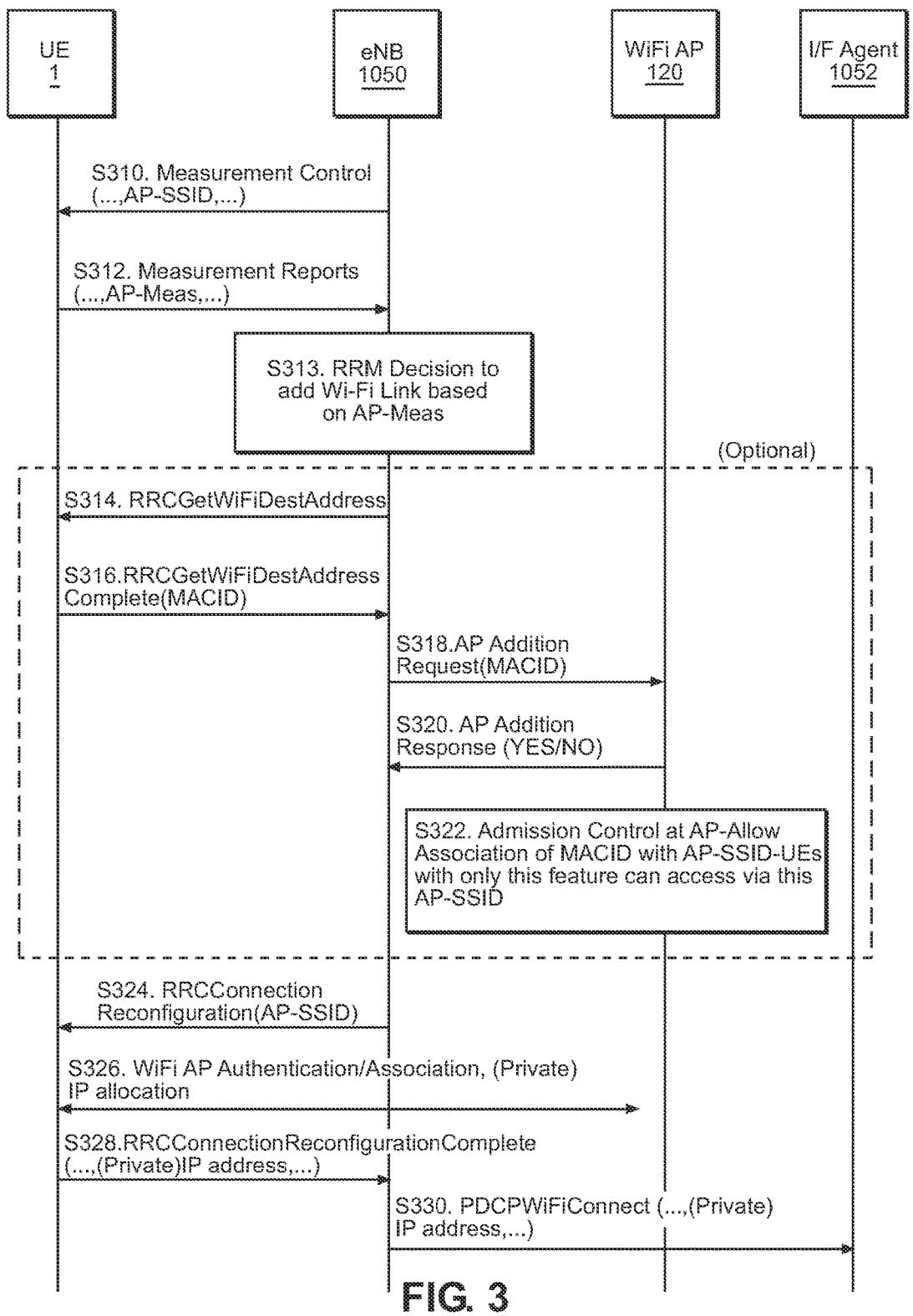
FIG. 3 is a signal (or call) flow diagram illustrating an example embodiment of a method for establishing a WiFi link with the UE.

FIG. 3 is a signal (or call) flow diagram illustrating an example embodiment of a method for establishing a WiFi link with the UE. The example embodiment shown in FIG. 3 will be discussed with regard to the communication system shown in FIG. 1. However, the same or substantially the same methodology may be applied other example embodiments.

Referring to FIGS. 1 and 3, at step S310 the eNB 1050 initiates setup of the WiFi link 122 between the WiFi AP 120 and the UE 1 by sending a measurement request message (Measurement Control) to the UE 1. The measurement request message may also be referred to as a measurement request and control message or a measurement control message. The measurement request message requests radio link and/or loading measurement information from the UE 1. In one example, the measurement request message may request that the UE 1 measure radio link quality and/or loading associated with one or more service set identifiers (SSIDs) identified in the measurement request message (e.g., SSID at WiFi AP 120). As is known, a SSID is an identifier for a WiFi subsystem at a WiFi AP, such as the WiFi AP 120. A WiFi AP can serve STAs using multiple SSIDs. As discussed herein, radio link and/or loading measurement information may sometimes be referred to as, for example, radio link and/or loading information, network condition information, link condition information, network link quality and/or loading information, link characteristics, link characteristic information, network characteristics, etc.

The measurement request message from the eNB 1050 may also configure measurement control parameters at the UE 1. The measurement request message includes a list of special SSIDs for which the eNB 1050 is requesting that the UE 1 report radio link quality and/or loading in the WiFi measurements portion of an Enhanced LTE Measurement Report (discussed later). As discussed herein, the special SSID is an SSID with which the UEs that support the boost mode of operation associate. That is, the special SSID is used in the context of example embodiments to identify UEs/STAs operating in the boost mode. In the figures, the special SSIDs may sometimes be referred to as SSIDn, SSIDc.

According to at least some example embodiments, in response to receiving the measurement request message, the UE 1 obtains WiFi and LTE radio link measurements for the SSIDs configured by the eNB 1050 in the measurement request message. The measurements of the WiFi radio link are in addition to the LTE link measurements regularly obtained by the UE 1 per existing LTE modes of operation. In addition to link quality, the UE 1 may also obtain WLAN loading information for the configured SSIDs.

In more detail, the WiFi radio link measurements may include link quality measurements, such as a Received Signal Strength Indicator (RSSI) of downlink WiFi packets measured by the UE 1. The LTE link quality measurements may include Reference Signal Receive Power (RSRP) and Reference Signal Receive Quality (RSRQ), which are well-known in the art. The WLAN loading information may be obtained by the UE 1 through broadcast transmission by the WiFi AP 120.

At step S312, the UE 1 sends a measurement report message (Measurement Reports) including the obtained radio link measurements to the eNB 1050. In one example, the obtained radio link measurements may be included in an Enhanced LTE Measurement Report. As discussed herein, the Enhanced LTE Measurement Report includes WiFi and LTE radio link quality and/or loading information.

Current LTE standards define signaling between a UE and eNB for conveying LTE radio link quality measured by the UE. This is sometimes referred to as a LTE measurement report. According to at least some example embodiments, this LTE measurement report is enhanced to further include WiFi link quality and/or loading information to obtain the Enhanced LTE Measurement Report.

According to one or more example embodiments, the WiFi AP 120 may be configured to utilize a special SSID for handling/separating WiFi links to be aggregated with LTE links in accordance with example embodiments. Consequently, UEs using WiFi links to SSIDs not considered "special SSIDs" may not be aggregated with LTE links in accordance with example embodiments.

Referring back to FIG. 3, in response to receiving the measurement report message, at step S313 the eNB 1050 (e.g., a Radio Resource Manager (RRM) at the eNB 1050) determines whether to add the WiFi link 122 (e.g., whether the addition of the WiFi link 122 is beneficial and/or desirable) for the UE 1 based on the radio link quality and/or loading information included in the Enhanced LTE Measurement Report from the UE 1.

If the eNB 1050 determines that the WiFi link 122 is not desirable, then the call flow terminates and the eNB 1050 continues delivering packets to the UE 1 over the LTE link 1054 in the conventional manner.

On the other hand, if the eNB 1050 determines that the WiFi link 122 is desirable and/or beneficial, then the eNB 1050 requests the WiFi MAC address of the UE 1 by sending a Radio Resource Control (RRC) WiFi MAC address request message (RRCGetWiFiDestAddress) to the UE 1 at step S314. The RRC WiFi MAC address request message as well as the other messages discussed herein with a RRC prefix, are RRC messages communicated using RRC signaling.

In more detail, for example, at step S313 the eNB 1050 determines whether to the WiFi link 122 is desirable and/or beneficial by comparing the received or received/reported WiFi link quality and/or loading with respective WiFi link quality and/or WiFi loading threshold values. In one example, if the WiFi link quality is greater than or equal to a WiFi link quality threshold and the WiFi loading is less than a WiFi loading threshold, then the eNB 1050 determines that adding the WiFi link 122 is beneficial and/or desirable, and sends the RRC WiFi MAC address request message to the UE 1.

Returning to FIG. 3, in response to the RRC WiFi MAC address request message (RRCGetWiFiDestAddress), at step S316 the UE 1 sends a RRC WiFi MAC address message (RRCGetWiFiDestAddressComplete) including the WiFi MAC address of the UE 1 to the eNB 1050.

After receiving the WiFi MAC address for the UE 1, at step S318 the eNB 1050 sends an AP addition request message (AP Addition Request) to the WiFi AP 120 including the WiFi MAC address of the UE 1. The AP addition request message requests that the WiFi AP 120 add the WiFi MAC address of the UE 1 to the list of UEs allowed to access the special SSID associated with the aggregated LTE and WiFi links.

In response to receiving the AP addition request message, the WiFi AP 120 determines whether to allow the UE 1 to access the special SSID. At step S320, the WiFi AP 120 sends an AP addition response message (AP Addition Response) to the eNB 1050 based on the determination.

According to at least some example embodiments, the WiFi AP 120 maintains a list of WiFi MAC identifiers (IDs) allowed to access a particular SSID. This list may be given, desired, pre-configured or provided by the eNB 1050 in the AP addition request message at step S318.

In addition to the list that indicates permissions for specific WiFi devices (identified by their unique WiFi MAC IDs) to access the SSID on the WiFi AP 120, the WiFi AP 120 may also take into account additional considerations such as existing loading to allow or deny a UE association via a particular SSID.

If the WiFi AP 120 decides to allow the UE 1 access to the special SSID, then at step S322 the WiFi AP 120 associates the WiFi MAC address of the UE 1 with the special SSID, and sends the AP addition response message indicating 'YES' to the eNB 1050. Otherwise, if the UE 1 is denied access to the special SSID, then the WiFi AP 120 sends an AP addition response message indicating 'NO' to the eNB 1050, the call flow terminates and the UE 1 continues to communicate over the LTE link 1054.

In response to receiving the AP addition response message indicating YES, the eNB 1050 initiates reconfiguration of the RRC connections at the UE 1 by sending a RRC connection reconfiguration message (RRCConnectionReconfiguration) to the UE 1 at step S324. The RRC connection reconfiguration message includes the SSID of the WiFi AP 120, and instructs the UE 1 to reconfigure its RRC connections by connecting to the SSID of the WiFi AP 120 identified in the RRC connection reconfiguration message. In response to receiving the RRC connection reconfiguration message, at step S326 the UE 1 establishes the WiFi link 122 with the WiFi AP 120 by exchanging authentication and association messages with the WiFi AP 120. In so doing, the UE 1 obtains a private/local IP address within the wireless local area network (WLAN) provided by the WiFi AP 120. Because methods for establishing the WiFi link 122, including the authentication and association messages discussed above are well-known, a detailed discussion is omitted.

After establishing the WiFi link 122 with the WiFi AP 120, at step S328 the UE 1 informs the eNB 1050 that RRC connection reconfiguration is complete by sending a RRC connection reconfiguration completion message (RRCConnectionReconfigurationComplete) to the eNB 1050. The RRC connection reconfiguration completion message includes the private/local IP address within the WLAN, which is assigned to the UE 1 by the WiFi AP 120 during the authentication/association process discussed above.

In response to receiving the RRC connection reconfiguration completion message, at step S330 the eNB 1050 updates the Interface Agent 1052 at the small wireless cell 105 with information required to enable tunneling of downlink PDCP packets from the eNB 1050 to the WiFi AP 120, and to enable mapping of IP packets received by the eNB 1050 from the WiFi AP 120 to the appropriate UE session, by sending a PDCP WiFi connection message (PDCPWiFiConnect) to the Interface Agent 1052. In one example, the information provided to the Interface Agent 1052 includes the local WiFi IP address assigned to the UE 1 by the WiFi AP 120 during the authentication/association process discussed above.

In another example embodiment, the Interface Agent 1052 establishes an IPSec tunnel with the UE 1 in response to receiving the WiFi IP address of the UE 1.

Once the UE 1 has established the WiFi link 122 with the WiFi AP 120 in accordance with the method shown, for example, in FIG. 3, the eNB 1050 may offload downlink PDCP packets from the LTE link 1054 by directing at least some downlink PDCP packets for delivery over the WiFi link 122 for transmission to the UE 1. The eNB 1050 offloads the downlink PDCP packets as discussed below in connection with FIG. 4.

In the method shown in FIG. 3, steps S314, S316, S318, S320 and S322 may be omitted. In this alternative example embodiment, steps S324, S326, S328 and S330 may follow step S313.

Figure 4:
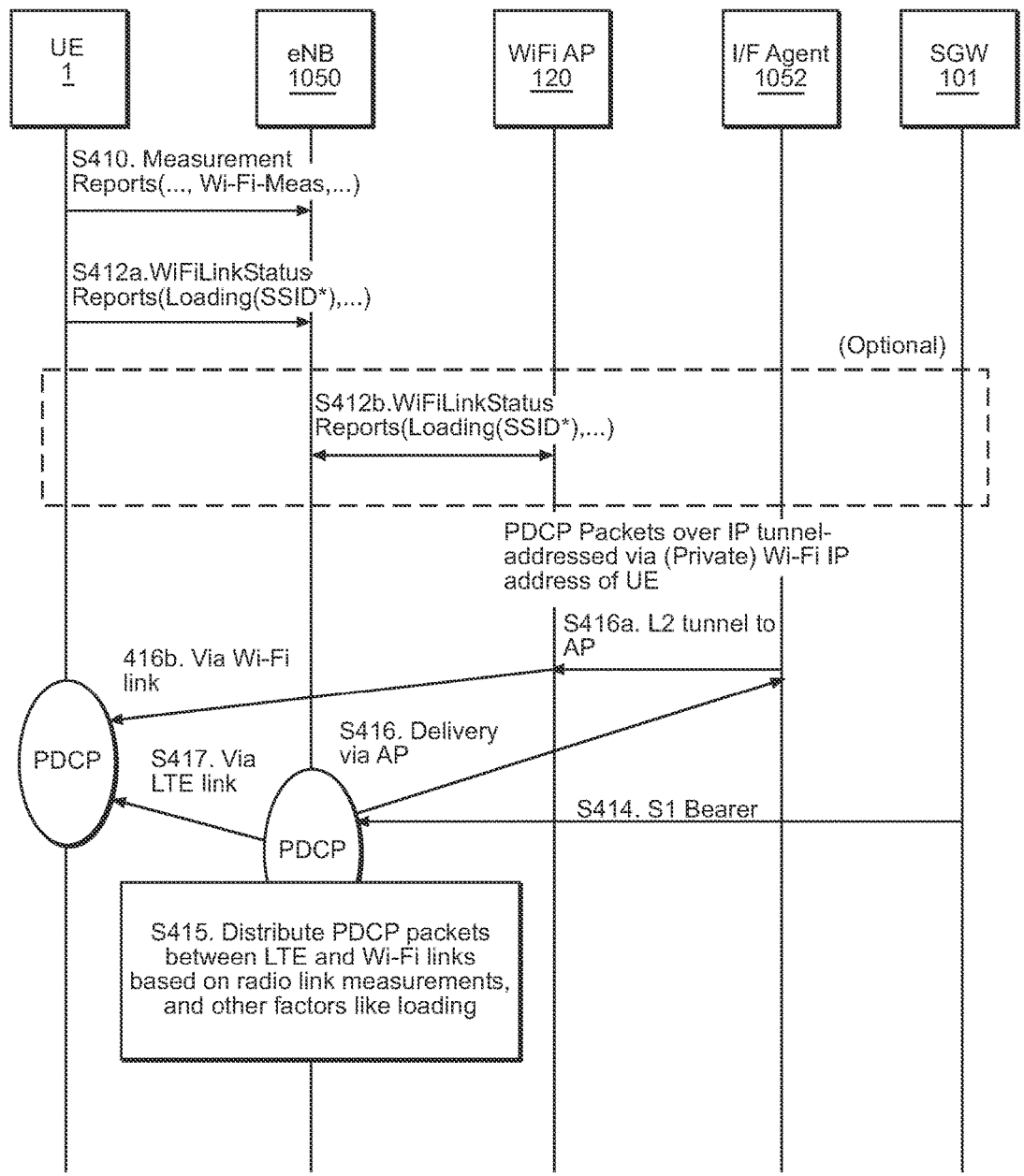
FIG. 4 is a signal (or call) flow diagram illustrating an example embodiment of a method for transmitting packets to the UE.

FIG. 4 is a signal (or call) flow diagram illustrating an example embodiment of a method for transmitting packets to the UE 1. As with FIG. 3, the example embodiment shown in FIG. 4 will be discussed with regard to the communication system shown in FIG. 1. However, the same or substantially the same methodology may be applied other example embodiments.

Still referring to FIG. 4, at step S414 the eNB 1050 receives downlink PDCP packets (also sometimes referred to herein as downlink bearer traffic) over the S1 bearer from the core network (e.g., SGW 101).

Upon receiving the downlink PDCP packets, at step S415 the eNB 1050 distributes PDCP packets for delivery over the LTE link 1054 and the WiFi link 122 based on the radio link quality and/or loading information from the UE 1. In one example, the eNB 1050 distributes a first portion of PDCP packets for delivery over the LTE link 1054 and a second portion of PDCP packets for delivery over the WiFi link 122. The eNB 1050 may also obtain additional WiFi link information from the WiFi AP 120 by exchanging WiFi link status report messages with the WiFi AP 120 as illustrated by step S412b in FIG. 4. It should be noted, however, that step S412b in FIG. 4 may be omitted. The additional WiFi link information may include, for example, overall loading on the WiFi interface at the WiFi AP 120.

In one example, at step S415 the eNB 1050 distributes PDCP packets for delivery over the LTE link 1054 and the WiFi link 122 according to a distribution function. The distribution function is a multi-link scheduler that schedules across the WiFi and LTE links using an algorithm that has inputs such as, but not limited to, radio link quality, loading of the two candidate links, etc. Scheduling functions such as this are well-known in the art, and thus, a detailed discussion is omitted.

Still referring to FIG. 4, at step S417 the eNB 1050 delivers (or transmits) the (e.g., first portion of) PDCP packets allocated to the LTE link 1054 to the UE 1 over the LTE link 1054.

Concurrently or simultaneously with step S417, the eNB 1050 delivers the (e.g., second portion of) PDCP packets allocated for delivery over the WiFi link 122 to the UE 1 at steps S416, S416a and S416b. In more detail, at steps S416 and 416a the eNB 1050 tunnels the downlink PDCP packets allocated for delivery over the WiFi link 122 to the WiFi AP 120 for delivery to the UE 1 by the WiFi AP 120 over the WiFi link 122.

According to at least some example embodiments, the UE 1 may measure (e.g., periodically or continuously measures) the LTE and WiFi radio link quality and/or loading. In accordance with example embodiments, the UE 1 may provide the eNB 1050 updated radio link quality and/or loading measurements periodically and/or when a current measurement of the LTE and/or WiFi radio link quality and/or loading differs from a previously measured and/or reported value by more than a threshold value.

With reference to FIG. 4, the UE 1 may send an updated measurement report message, including the updated radio link quality and/or loading measurements, to the eNB 1050 at step S410, and the UE 1 may send a status report message, including updated WiFi loading information, to the eNB 1050 at step S412a. In one example, the status report message may include HotSpot 2.0 loading information provided in WiFi control frames over HotSpot 2.0 signaling.

The eNB 1050 may also obtain additional WiFi link information from the WiFi AP 120 by exchanging WiFi link status report messages with the WiFi AP 120 as illustrated by step S412b in FIG. 4. It should be noted, however, that step S412b in FIG. 4 may be omitted. The additional WiFi link information may include, for example, overall loading on the WiFi interface at the WiFi AP 120.

Receipt of the updated radio link quality information, loading information and/or additional WiFi link information may trigger reconfiguration of the distribution ratio among the LTE link 1054 and WiFi link 122. In this regard, the method discussed above with regard to FIG. 4 may be performed (or re-performed) as discussed above.

Figure 5:
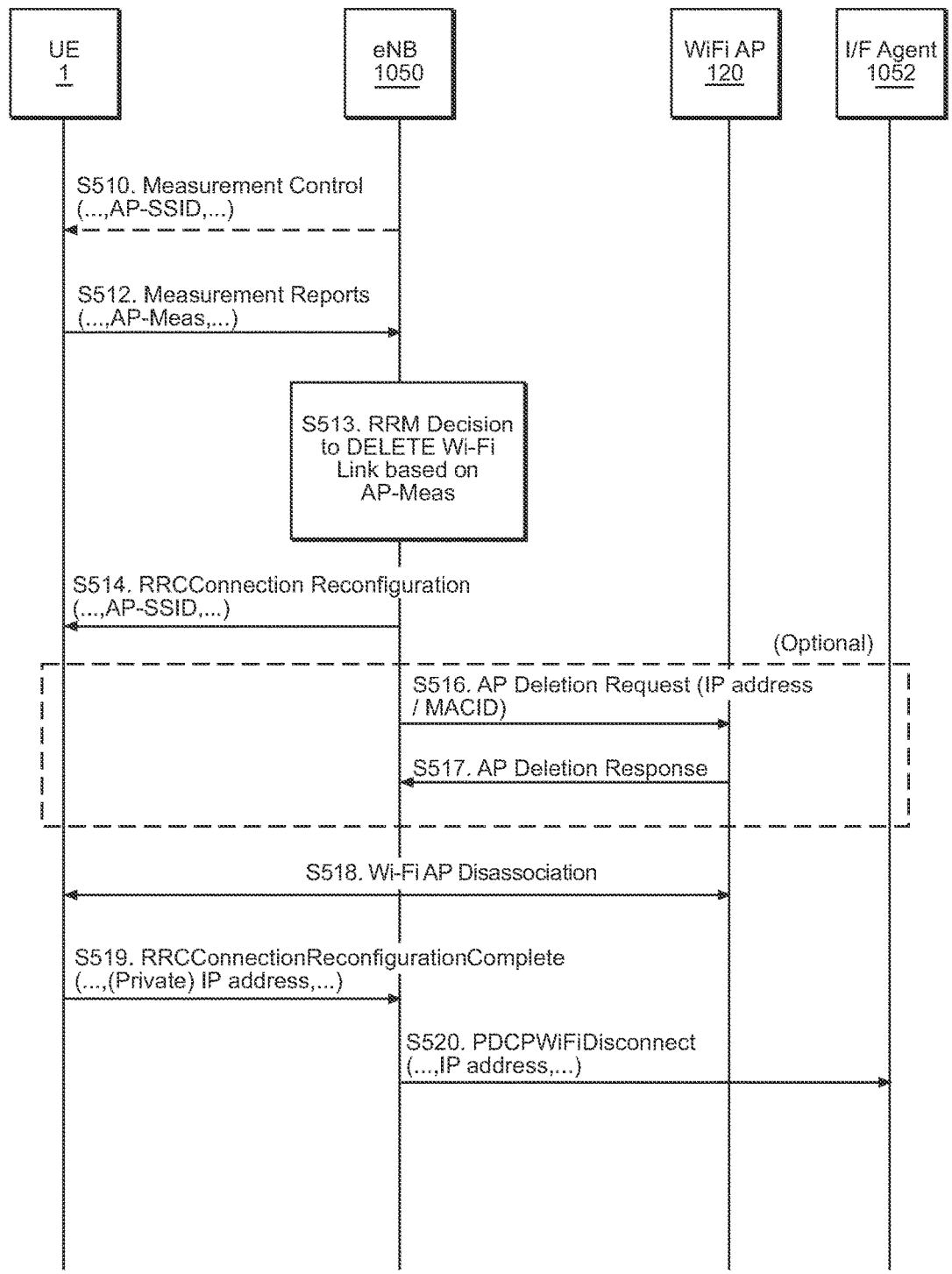
FIG. 5 is a signal (or call) flow diagram illustrating an example embodiment of a method for tearing down a WiFi link with the UE.

FIG. 5 is a signal (or call) flow diagram illustrating an example embodiment of a method for deleting and/or tearing down a WiFi link with the UE. The example embodiment shown in FIG. 5 will be discussed with regard to the communication system shown in FIG. 1. However, the same or substantially the same methodology may be applied other example embodiments.

As discussed above, the UE 1 may measure (e.g., periodically or continuously measures) the LTE and WiFi radio link quality and/or loading. In accordance with example embodiments, the UE 1 may provide the eNB 1050 updated radio link quality and/or loading measurements (e.g., in an Enhanced LTE Measurement Report) periodically and/or when a current measurement of the LTE and/or WiFi radio link quality and/or loading differs from a previously measured and/or reported value by more than a threshold value.

Referring now to FIGS. 1 and 5, at step S512 the UE 1 sends a measurement report message including the updated Enhanced LTE Measurement Report to the eNB 1050. The Enhanced LTE Measurement Report and the measurement report message sent at step S512 is the same or substantially the same as that discussed above with regard to FIG. 4.

According to at least some example embodiments, the eNB 1050 may solicit updated measurements by sending a measurement request (or control) message at step S510. In one example, the eNB 1050 may determine that it is necessary to obtain updated measurements of the WiFi link 122 faster than the rate at which the UE is sending (e.g., based on various threshold values). In this case, the eNB 1050 may solicit updated measurement reports from the UE 1. The eNB 1050 may determine that such an updated measurement report is necessary when the eNB 1050 determines that the UE 1 has entered a coverage edge of Wi-Fi network. In this case, the eNB 1050 may be proactive in obtaining more recent measurements of the WiFi link rather than wait for the UE 1 to send the measurement reports on its own to reduce the data sent over the Wi-Fi link since the alternative LTE link is available, and in some cases, inform the UE 1 to tear down the association with the current WiFi AP and associate with another WiFi AP.

Returning to FIG. 5, in response to receiving the measurement report message, at step S513 the eNB 1050 determines whether to delete (or tear down) the WiFi link 122 for the UE 1 based on the information included in the Enhanced LTE Measurement Report from the UE 1.

For example, if the WiFi link quality (e.g., in absolute terms or relative to the LTE link quality) falls below a link quality threshold value, then the eNB 1050 may determine that the WiFi link 122 is no longer desirable and should be deleted or torn down. In another example, if the estimated data rate available over the WiFi link 122 based on the radio link quality estimate and/or loading on the WiFi AP 120 falls below a threshold value, then the eNB 1050 may determine that the WiFi link 122 is no longer desirable and should be deleted or torn down. In yet another example, if feedback from PDCP status reports that packets sent on WiFi link 122 are experiencing delays and the number of timeouts greater than or equal to a threshold, then the eNB 1050 may determine that the WiFi link 122 is no longer desirable and should be deleted or torn down.

If the eNB 1050 determines that the WiFi link with the UE 1 is still desirable, then the call flow shown in FIG. 5 terminates and the eNB 1050 continues communicating over the LTE and WiFi links as discussed above with regard to FIG. 4.

On the other hand, if the eNB 1050 determines that the WiFi link 122 with the UE 1 is no longer desirable and should be deleted or torn down, then the eNB 1050 initiates reconfiguration of the RRC connections at the UE 1 by sending a RRC connection reconfiguration message (RRCConnectionReconfiguration) to the UE 1 at step S514. The RRC connection reconfiguration message is essentially the same as the RRC connection reconfiguration message discussed above with regard to FIG. 3, except that the RRC connection reconfiguration message sent at step S514 instructs the UE 1 to reconfigure its RRC connections by disassociating/disconnecting from the SSID of the WiFi AP 120 identified in the RRC connection reconfiguration message.

The eNB 1050 may also request deletion of the WiFi link 122 at the WiFi AP 120 by sending a WiFi deletion request message (AP Deletion Request) to the WiFi AP 120 at step S516. If the eNB 1050 sends the WiFi deletion request message to the WiFi AP 120, the WiFi AP 120 deletes the UE context at the WiFi AP 120 and notifies the eNB 1050 that the UE context has been deleted by sending a WiFi deletion response message (AP Deletion Response) to the eNB 1050 at step S517. Although shown in FIG. 5, steps S516 and S517 may be omitted.

Still referring to FIG. 5, after the eNB 1050 initiates deletion of the WiFi link 122, at step S518 the UE 1 and the WiFi AP 120 exchange disassociation messages to dissociate/disconnect the UE 1 from the SSID of the WiFi AP 120. Because methods for disassociating/disconnecting a WiFi connection, including the disassociation messages, discussed above are well-known, a detailed discussion is omitted.

After the WiFi link 122 between the UE 1 and the WiFi AP 120 is deleted (torn down), at step S519 the UE 1 informs the eNB 1050 that RRC connection reconfiguration is complete by sending a RRC connection reconfiguration completion message (RRCConnectionReconfigurationComplete) to the eNB 1050.

In response to receiving the RRC connection reconfiguration completion message, at step S520 the eNB 1050 updates the Interface Agent 1052 by sending a PDCP WiFi disconnection message (PDCPWiFiDisconnect) to the Interface Agent 1052. The PDCP WiFi disconnection message informs the Interface Agent 1052 that the WiFi link 122 between the UE 1 and the WiFi AP 120 has been deleted, and that downlink PDCP packets should no longer be directed to the WiFi link 122 for delivery to the UE 1.

In another example embodiment, the Interface Agent 1052 may tear down the IPSec tunnel established with UE 1 in response to reception of PDCP WiFi disconnection message.

Figure 2:
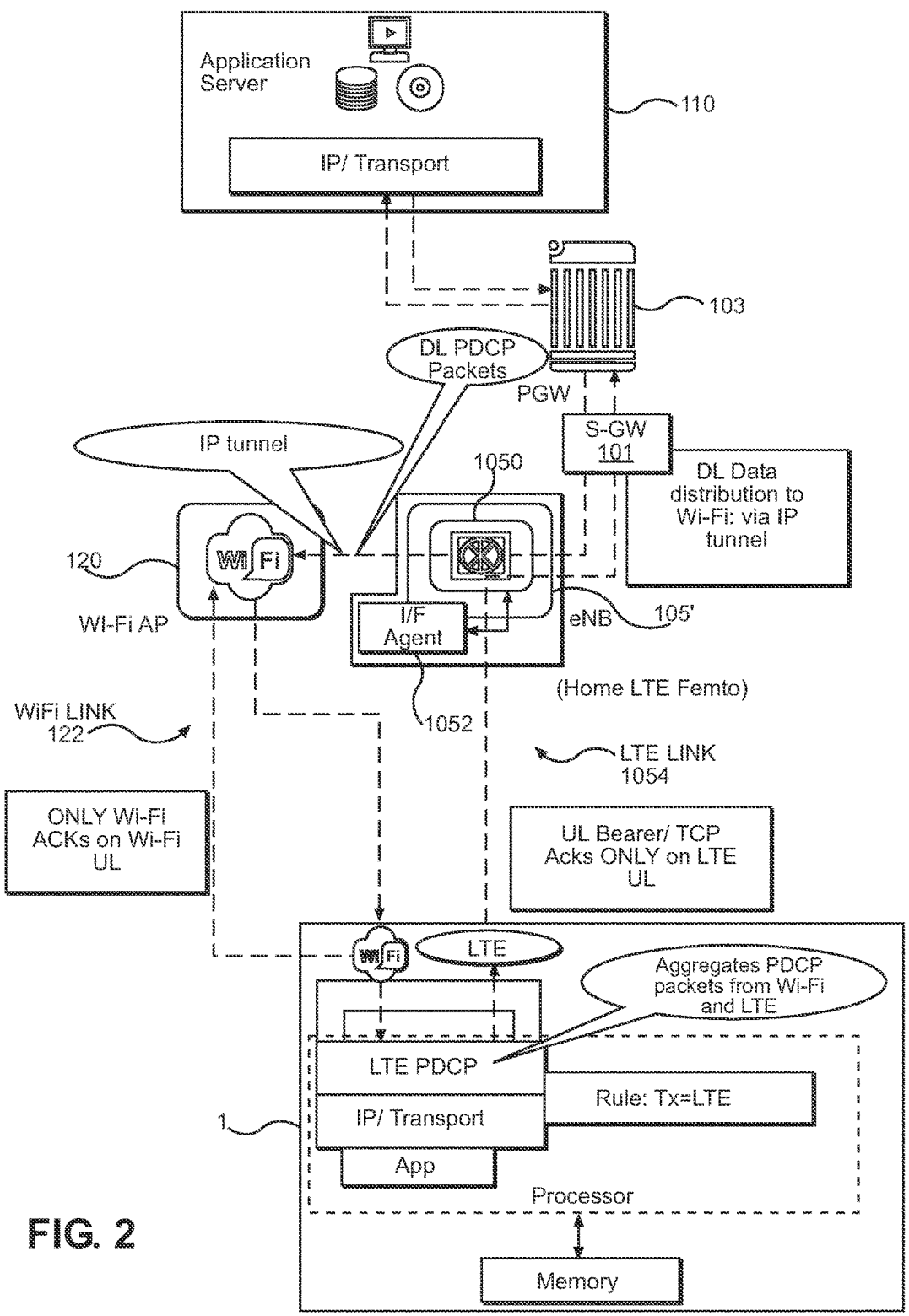
FIG. 2 illustrates another example embodiment of a communication system having integrated cellular and WiFi systems.

FIG. 2 illustrates another example embodiment of a communication system having integrated LTE and WiFi systems. The communication system in FIG. 2 is similar to the communication system shown in FIG. 1, except that the eNB 1050 and the WiFi AP 120 are not co-located at a small wireless cell. Rather, in the example embodiment shown in FIG. 6, the small wireless cell 105' includes the eNB 1050, and the WiFi AP 120 is separate from the small wireless cell 105'.

In this example embodiment, the eNB 1050 at the small wireless cell 105 is communicatively connected to the WiFi AP 120, for example, by an Ethernet connection. The eNB 1050 establishes an IP tunnel (e.g., a local IP tunnel) to the WiFi AP 120 using the local IP address assigned to the eNB 1050 by the WiFi AP 120.

The operation of the communication system shown in FIG. 2 is similar to the operation of the communication system shown in FIG. 1, except that the eNB 1050 communicates with the WiFi AP 120 through an external connection (e.g., an Ethernet connection that is external to the small wireless cell 105') between the eNB 1050 and the WiFi AP 120, rather than an internal connection within the small wireless cell.

The methods discussed above with regard to FIGS. 3 through 5 may be similarly performed by the components of the communication system shown in FIG. 2. Therefore, additional discussions of the methods shown in FIGS. 3 through 5 in connection with the communication system shown in FIG. 2 will not be repeated here.

Figure 6:
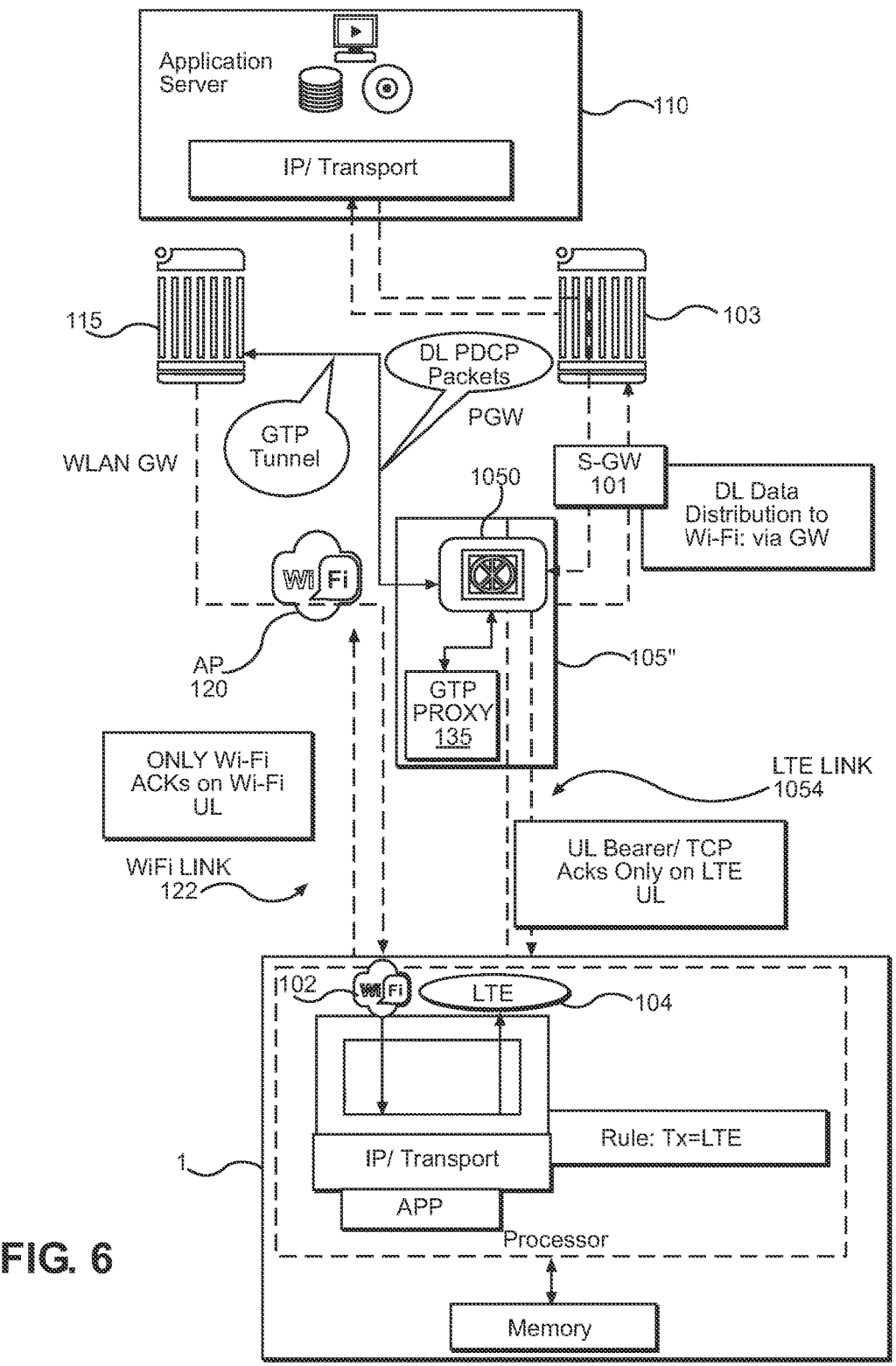
FIG. 6 illustrates an example embodiment of a communication system having integrated cellular and WiFi systems.

FIG. 6 illustrates another example embodiment of a communication system having integrated LTE and WiFi systems.

The communication system shown in FIG. 6 is similar to the communication system shown in FIG. 2, but further includes a WLAN gateway (GW) 115. Moreover, in the example embodiment shown in FIG. 6, the small wireless cell 105″ further includes a General Packet Radio Service (GPRS) tunneling protocol (GTP) proxy 135 communicatively coupled to the eNB 1050. Since the example embodiment shown in FIG. 6 is similar to the example embodiment shown in FIG. 2, only the differences between these example embodiments and additional components will be discussed in detail.

In the example embodiment shown in FIG. 6, the eNB 1050 is communicatively coupled to the WiFi AP 120 via the WLAN GW 115. In more detail, the eNB 1050 is connected to the WiFi AP 120 via a GTP tunnel through the WLAN GW 115. As is known, GTP is a group of IP-based communications protocols used to carry tunneled payload within cellular networks (e.g., Global System for Mobile communications (GSM), UMTS, LTE, etc.). In the example embodiment shown in FIG. 6, the WLAN including the WiFi AP 120 and the WLAN GW 115 may be a trusted or an untrusted non-3GPP access network, as defined by 3GPP standards.

As discussed above, the eNB 1050 includes the GTP proxy 135. The GTP proxy 135 maintains a mapping between the RNTI for the UE session, the IP address for the UE session, and the GTP tunnel identifier for the GTP tunnel between the eNB 1050 and the WLAN GW 115. The GTP proxy 135 also maintains the GTP tunnel between the eNB 1050 and the WLAN GW 115 for communication with the UE 1 via the WiFi link 122. The GTP proxy 135 uses the IP address associated with the UE session to redirect at least a portion of downlink PDCP packets over the appropriate GTP tunnel to the WLAN GW 115 for transmission to the UE 1 via the WiFi AP 120.

Still referring to FIG. 6, the UE 1 includes a WiFi stack (WiFi STA) 102 and a LTE stack 104, example operations of which will be discussed in more detail later.

Example operation of the communication system shown in FIG. 6 will be discussed in more detail below with regard to FIGS. 7 through 9.

Figure 7:
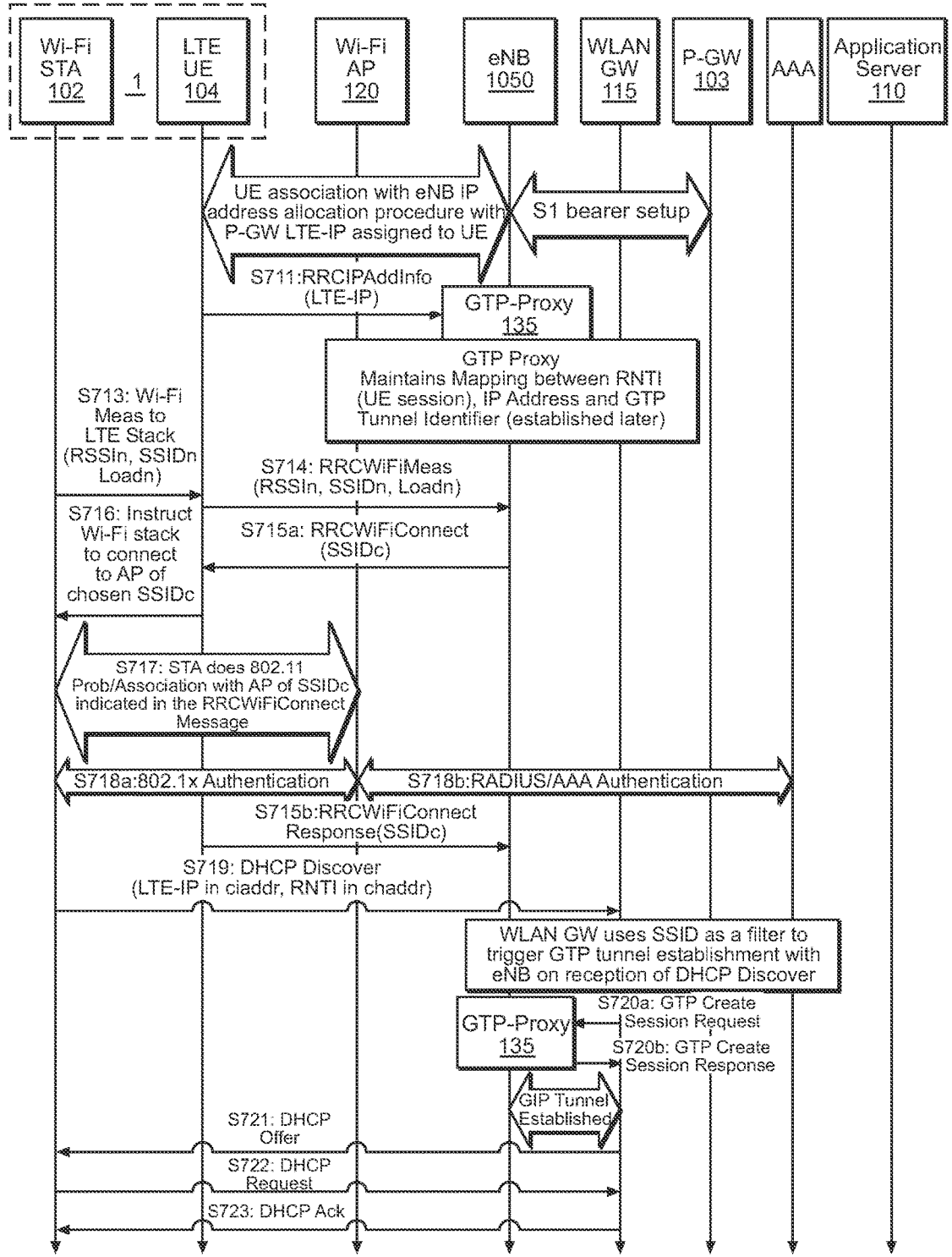
FIG. 7 is a signal (or call) flow diagram illustrating an example embodiment of a method for establishing a GTP tunnel between the eNB and the WLAN GW.

FIG. 7 is a signal (or call) flow diagram illustrating an example embodiment of a method for establishing a GTP tunnel between the eNB 1050 and the WLAN GW 115. The example embodiment shown in FIG. 7 will be discussed with regard to the communication system shown in FIG. 6. However, the same or substantially the same methodology may be applied other example embodiments.

Referring to FIG. 7, after establishing a LTE IP connection between the UE 1 and the eNB 1050 (including, e.g., establishing an association between the UE 1 and the eNB 1050, and performing IP address allocation procedures with the PGW 103 to assign an LTE IP address for the UE session of the UE 1), and performing S1 bearer setup between the eNB 1050 and the PGW 103, at step S711 the LTE stack 104 at the UE 1 provides information for the GTP Proxy 135 to correlate the LTE IP address with the UE session Identifier (Radio Network Terminal Identifier—RNTI) by sending a RRC setup initiation message (RRCIPAddInfo) to the GTP proxy 135 at the eNB 1050. The setup initiation message includes the LTE IP address for the UE session assigned by the PGW 103 when establishing the LTE IP connection with the core network.

The WiFi stack 102 at the UE 1 sends a WiFi measurement message to the LTE stack 104 at step S713. The WiFi measurement message includes radio link and/or loading measurement information for the WiFi link 122 between the UE 1 and the WiFi AP 120. In one example, the WiFi measurement message may include a received signal strength indication (RSSI) and/or loading information for a particular SSID (e.g., SSIDn in FIG. 7) at the WiFi AP 120.

Upon receiving the WiFi measurement message from the WiFi stack 102, at step S714 the LTE stack 104 at the UE 1 sends a RRC WiFi measurement message (RRCWiFiMeas) including the WiFi link quality and/or loading characteristics received from the WiFi stack 102 to the eNB 1050.

In response to the RRC WiFi measurement message (RRCWiFiMeas) from the UE 1, at step S715a the eNB 1050 sends a RRC WiFi connection message (RRCWiFiConnect) to the LTE stack 104 at the UE 1. The RRC WiFi connection message identifies a SSID (SSIDc in FIG. 7) at the WiFi AP 120 to which the UE 1 should associate/connect.

At step S716, the LTE stack 104 instructs the WiFi stack 102 to connect to the SSID identified in the RRC WiFi connection message by forwarding the RRC WiFi connection message to the WiFi stack 102.

In response to the RRC WiFi connection message from the LTE stack 104, the WiFi stack 102 establishes a WiFi connection (e.g., WiFi link 122) with the WiFi AP 120 by: (i) performing, for example, 802.11 probe/association with the WiFi AP 120 at step S717; and (ii) performing WiFi (e.g., 802.11) authentication with the WiFi AP 120 at step S718a. Because the procedures for establishing a WiFi connection in this manner are well-known, a detailed discussion is omitted.

At step S718b, the WiFi AP 120 performs remote authentication dial in user service (RADIUS)/authentication, authorization and accounting (AAA) authentication with the core network (e.g., via the AAA server). Because authentication procedures such as these are well-known, a detailed discussion is omitted.

Still referring to FIG. 7, at step S715b the LTE stack 104 provides a RRC WiFi connection response message (RRCWiFiConnectResponse) to the eNB 1050 to notify the eNB 1050 that the UE 1 has connected to (associated with) the SSID identified in the RRC WiFi connection message.

At step S719, the WiFi stack 102 triggers setup of the GTP tunnel between the WLAN GW 115 and the eNB 1050 by sending a Dynamic Host Configuration Protocol (DHCP) Discover message to the WLAN GW 115. The DHCP Discover message is an IP address lease request, including the IP address assigned by the PGW 103 and the RNTI associated with the specific SSID to which the UE 1 is connected. The WLAN GW 115 uses the SSID (or RNTI associated with the SSID) in the DHCP Discover message to trigger the establishment of the GTP tunnel with the eNB 1050. When a DHCP server receives a DHCP Discover message from a client the server reserves an IP address for the UE 1. A GTP tunnel is then established between the eNB 1050 and the WLAN GW 115 in a manner similar to the setup of a GTP tunnel for a S2a/S2b interface, which is well-known in the art. As well known in the art, S2a procedures are followed for establishment of the GTP tunnel, when the WiFi network (including WLAN GW 115 and WiFi AP 120) is considered trusted, per the 3GPP standards, by the eNB. In another example embodiment, S2b procedures are followed for establishment of the GTP tunnel, when the WiFi network (including WLAN GW 115 and WiFi AP 120) is considered un-trusted, per the 3GPP standards, by the eNB.

In more detail with regard to establishing the GTP tunnel, at step S720*a* the WLAN GW 115 requests that the GTP proxy 135 establish a GTP tunnel between the eNB 1050 and the WLAN GW 115 by sending a GTP create session request message to the GTP proxy 135. The GTP create session request message includes the LTE IP address received from the UE 1 in the DHCP Discover message sent at step S719 and a unique identifier for the UE 1 (e.g., international mobile subscriber identity (IMSI)). In an example embodiment, this is included as the well-known PAA (PDN Address Allocation) element in the GTP create session request message.

The GTP Proxy 135 verifies that the LTE IP address received in the GTP create session request message is associated with a valid UE session using the mapping between the UE session and the assigned LTE IP address from step S711 that is stored at the GTP proxy 135.

Upon successful verification that the LTE IP address is associated with a valid UE session, the GTP Proxy 135 sends a GTP create session response message to the WLAN GW 115. The GTP create session response message includes the same LTE IP address that was assigned to the UE 1 by the LTE network. If the GTP Proxy 135 is unable to verify that the LTE IP address received in the GTP create session request message is associated with a valid UE session, then the GTP proxy may initiate procedures to reject the GTP tunnel creation request. Since these procedures are well-known, a detailed discussion is omitted.

Still referring to FIG. 7, after establishing the GTP tunnel with the eNB 1050, and in response to the DHCP Discover message, at step S721 the WLAN GW 115 sends a DHCP Offer message 5711 to the UE 1. As is known, a DHCP Offer message includes the MAC address of the UE 1, the IP address that the WLAN GW 115 has reserved for the UE 1, the subnet mask, the duration of the IP address lease, and the IP address of the DHCP server (in this case the WLAN GW 115) offering the IP address lease. In this example, the WLAN GW 115 includes the same LTE IP address as received in the GTP create session response in step S720*b*.

In response to the DHCP Offer message, at step S722 the UE 1 sends a DHCP request message to the WLAN GW 115 requesting the IP address offered in the DHCP Offer message S711.

In response to the DHCP request message from the UE 1, at step S723 the WLAN GW 115 sends a DHCP acknowledgement (Ack) message S713 to the UE 1. The DHCP Ack message includes the lease duration and any other configuration information requested by the UE 1, thereby completing the IP configuration process such that the UE 1 is able to transmit and receive packets to and from the eNB 1050 via the WiFi AP 120 and WLAN GW 115.

Once the GTP tunnel between the WLAN GW 115 and the eNB 1050 is setup (e.g., according to the method shown in FIG. 7) and the IP configuration process completed, PDCP packets may be delivered to the UE 1 over the WiFi link 122 by tunneling the PDCP packets received at the eNB 1050 to the WLAN GW 115 over the GTP tunnel.

Figure 8:
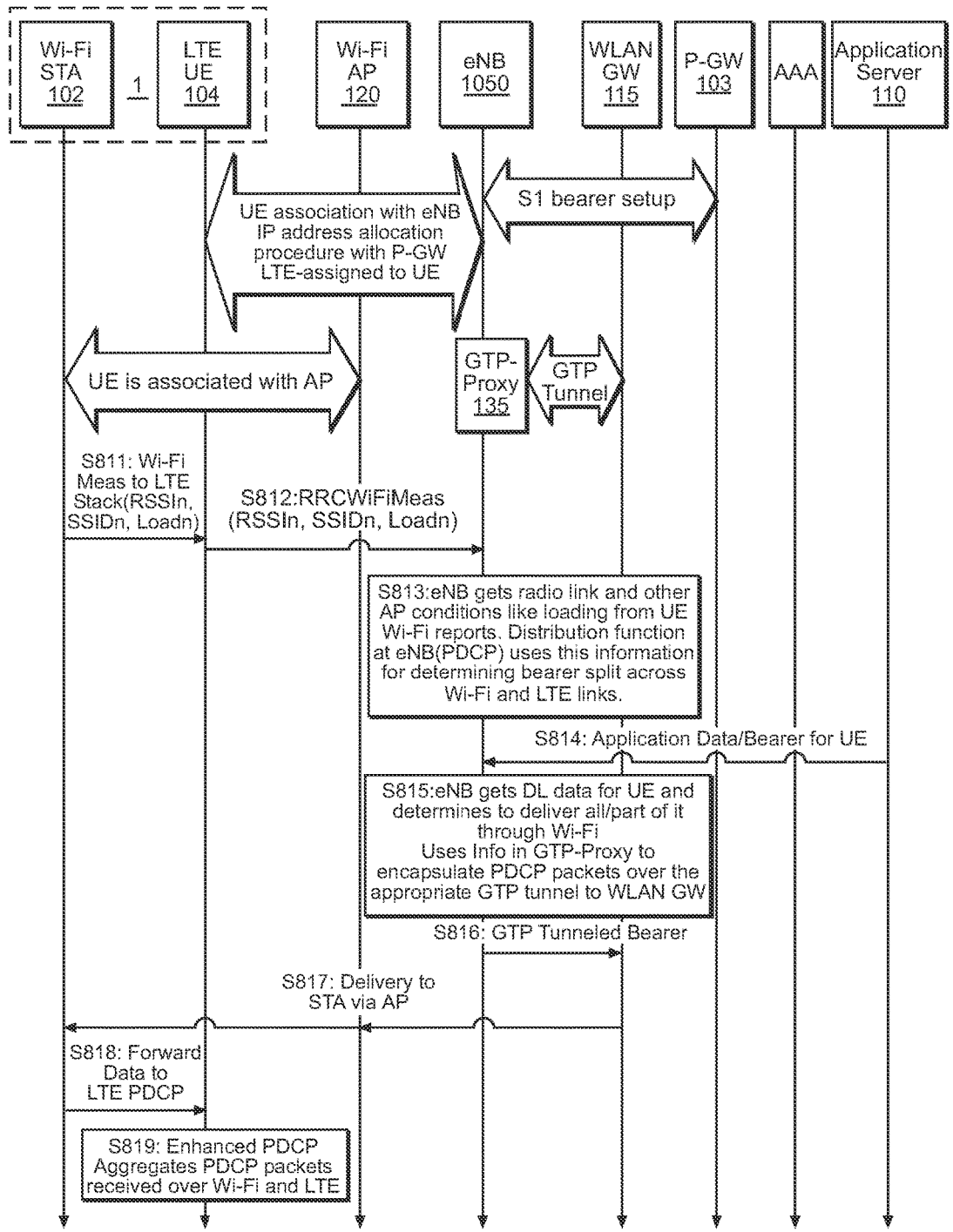
FIG. 8 is a signal (or call) flow diagram illustrating an example embodiment of a method for delivering PDCP packets to a UE.

FIG. 8 is a signal (or call) flow diagram illustrating an example embodiment of a method for delivering PDCP packets to the UE 1 over the LTE and WiFi links by tunneling at least a portion of downlink PDCP packets received at the eNB 1050 from the eNB 1050 to the WLAN GW 115 for transmission to the UE 1 over the WiFi link 122.

The example embodiment shown in FIG. 8 will be discussed with regard to the communication system shown in FIG. 6. However, the same or substantially the same methodology may be applied other example embodiments.

Referring to FIG. 8, at step S811 the WiFi stack 102 at the UE 1 sends a WiFi measurement message to the LTE stack 104 at the UE 1. The WiFi measurement message may be the same or substantially the same as the WiFi measurement message discussed above with regard to FIG. 7.

Upon receiving the WiFi measurement message from the WiFi stack 102, at step S812 the UE 1 (e.g., via the LTE stack 104) sends a RRC WiFi measurement message (RRC-WiFiMeas) including the WiFi link characteristics received from the WiFi stack 102. The RRC WiFi measurement message may be the same or substantially the same as the RRC WiFi measurement message discussed with regard to FIG. 7.

Based on the WiFi link characteristics received in the RRC WiFi measurement message and network condition information for the LTE link 1054 provided by the eNB 1050, at step S813 the eNB 1050 determines a PDCP packet distribution policy according to a distribution function. The PDCP packet distribution policy identifies the manner in which downlink PDCP packets should be distributed among the WiFi link 122 and the LTE link 1054 with the UE 1.

On the basis of information such as radio link quality and/or the loading on WiFi and LTE links, the distribution function determines the ratio of the downlink PDCP packets to be delivered via LTE link and the WiFi link. In this regard, the distribution function is a multi-link scheduler that schedules transmissions of PDCP packets across WiFi and LTE links using an algorithm having inputs such as, but not limited to, radio link quality, loading of the two candidate links, etc. Scheduling functions such as this are well-known in the art, and thus, a detailed discussion is omitted.

According to at least some example embodiments, the PDCP packet distribution policy may be one of: (i) a WiFi only mode in which the eNB 1050 tunnels all PDCP packets intended for the UE 1 to the WLAN GW 115 for transmission to the UE 1 over the WiFi link 122; (ii) a LTE only mode in which the eNB 1050 transmits all PDCP packets intended for the UE 1 over the LTE link 1054; and (iii) a hybrid WiFi-LTE mode in which the eNB 1050 tunnels some (e.g., a first portion) of the PDCP packets intended for the UE 1 to the WLAN GW 115 for transmission to the UE 1 over the WiFi link 122, while transmitting other (e.g., a second portion) PDCP packets intended for the UE 1 over the LTE link 1054. In the hybrid WiFi-LTE mode, the PDCP packets may be transmitted to the UE 1 over the WiFi link 122 and the LTE link 1054 at least one of concurrently and simultaneously.

When tunneling the downlink PDCP packets to the WLAN GW 115, the eNB 1050 utilizes information maintained at the GTP proxy 135 to encapsulate the PDCP packets over the appropriate GTP tunnel to the WLAN GW 115.

In more detail, as mentioned above with regard to steps S720*a* and S720*b* in FIG. 7, the GTP proxy 135 creates a GTP tunnel with the WLAN GW 115, and stores the mapping between the GTP tunnel identifier and the IP address of the UE 1 for which the GTP tunnel is created. The GTP proxy 135 also maintains a mapping between the UE's IP address and the UE session identifier in eNB 1050 (the RNTI). When a downlink PDCP packet destined for the UE 1 is sent by the eNB 1050, the message/signal from the eNB 1050 is associated with a RNTI. The GTP proxy 135 derives the IP address corresponding to the RNTI, and uses the derived IP address to select the GTP tunnel over which the PDCP packet is to be sent, thereby encapsulating the PDCP packet for transmission over the GTP tunnel to the WLAN GW 115.

Returning to FIG. 8, at step S814 the eNB 1050 receives downlink bearer traffic (including downlink PDCP packets) from the application server 110.

At step S815, the eNB 1050 distributes the downlink bearer traffic among the WiFi link 122 and the LTE link 1054 according to the PDCP packet distribution policy determined at step S813. The eNB 1050 then delivers the PDCP packets to the UE 1 over the WiFi link 122 and the LTE link 1054 accordingly.

In more detail, the eNB 1050 transmits the (e.g., first portion of the) PDCP packets allocated to the LTE link 1054 over the LTE link 1054 between the eNB 1050 and the UE 1.

With regard to the (e.g., second portion of the) PDCP packets allocated for transmission on the WiFi link 122, at step S816 the eNB 1050 sends these PDCP packets to the WLAN GW 115 through the GTP tunnel.

At step S817, the WLAN GW 115 delivers the tunneled PDCP packets to the UE 1 via the WiFi AP 120 over the WiFi link 122 between the WiFi AP 120 and the UE 1.

At the UE 1, the WiFi stack 102 at the UE 1 forwards the PDCP packets received over the WiFi link 122 to the LTE stack 104. The LTE stack 104 aggregates the PDCP packets received over the WiFi link 122 and the LTE link 1054. In more detail, the UE 1 receives downlink packets sent by the eNB 1050 over the WiFi link 122 from the WiFi stack 102, and stores the received PDCP packets with the downlink packets received over the LTE link 1054 in a common buffer. The UE 1 then reorders the received PDCP packets (e.g., per PDCP sequence number) and delivers the reordered PDCP packets to upper layer applications for further processing and reception of the downlink bearer traffic.

After establishing the GTP tunnel with the WLAN GW 115 as discussed above with regard to FIG. 7, the eNB 1050 may determine that the UE 1 should disassociate from the WiFi AP 120 and resume communication solely over the LTE link 1054 with the UE 1.

Figure 9:
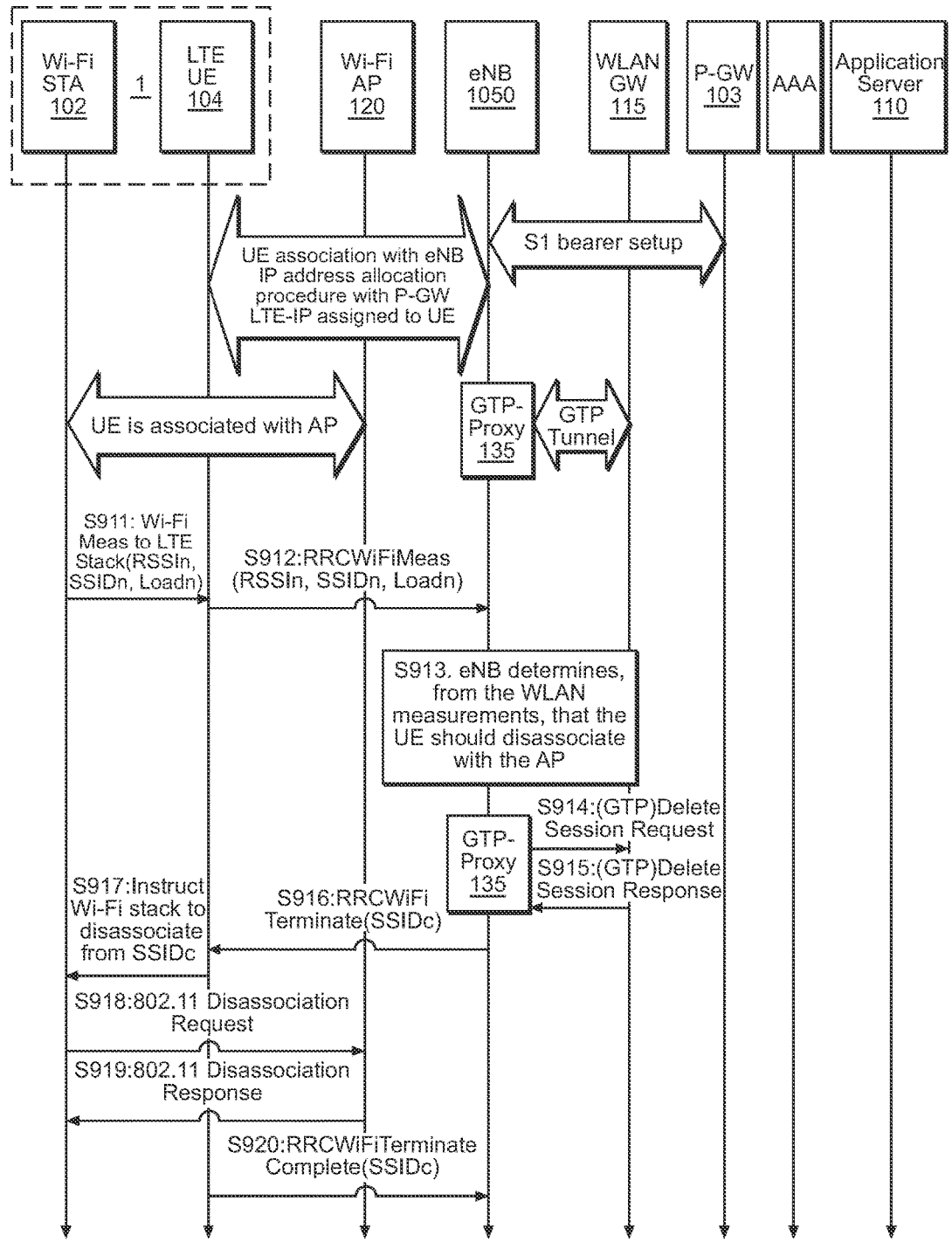
FIG. 9 is a signal (or call) flow diagram illustrating an example embodiment of a method for WiFi disassociation and GTP tunnel teardown.

FIG. 9 is a signal (or call) flow diagram illustrating an example embodiment of a method for WiFi disassociation and GTP tunnel teardown. The example embodiment shown in FIG. 9 will be discussed with regard to the communication system shown in FIG. 6. However, the same or substantially the same methodology may be applied other example embodiments.

Referring to FIG. 9, based on the WiFi and LTE link characteristics received in a RRC WiFi measurement message at step S912, the eNB 1050 determines whether the UE 1 should disassociate from the WiFi AP 120, and whether the GTP tunnel between the eNB 1050 and the WLAN GW 115 should be torn down.

In more detail, the eNB 1050 determines whether sending data via the WiFi link 122 is still desirable based on the radio link information for the WiFi link 122 and the LTE link 1054 reported by the UE 1 in the RRC WiFi measurement message. In one example, if the WiFi link quality (e.g., in absolute terms or relative to the LTE link quality) is less than a threshold value, the eNB 1050 determines that sending data via the WiFi link 122 is no longer desirable. In another example, if the estimated data rate available from the WiFi link 122 based on the radio link quality estimate and/or loading at the WiFi AP 120 is less than a threshold value, the eNB 1050 determines that sending data via the WiFi link 122 is no longer desirable. In still another example, the eNB 1050 may determine that sending data via the WiFi link 122 is no longer desirable if feedback from PDCP Status reports indicate that packets sent on the WiFi link 122 are experiencing delays and a number of timeouts that exceed a threshold value.

When the eNB 1050 determines that the UE 1 should disassociate from the WiFi AP 120 and the GTP tunnel should be torn down, the GTP proxy 135 at the eNB 1050 requests tear down of the GTP tunnel by sending a (GTP) Delete Session Request to the WLAN GW 115 at step S914. In response to the (GTP) Delete Session Request, the WLAN GW 115 deletes the established GTP tunnel, and sends a (GTP) Delete Session Response to the eNB 1050 at step S915.

After the GTP tunnel is deleted, at step S916 the eNB 1050 instructs the UE 1 to dissociate from the WiFi AP 120 by sending a RRC WiFi termination message (RRCWiFi-Terminate) to the UE 1 over the LTE link 1054. The RRC WiFi termination message includes the SSID with which the UE 1 is currently associated.

At step S917 the LTE stack 104 instructs the WiFi stack 102 at the UE 1 to disassociate from the SSID at the WiFi AP 120 in response to the RRC WiFi termination message from the eNB 1050.

In response to the instruction from the LTE stack 104, the WiFi stack 102 disassociates from the WiFi AP 120 by exchanging disassociation request and response messages with the WiFi AP 120 at steps S918 and S919.

When the disassociation is complete, the UE 1 informs the eNB 1050 that the UE 1 has disassociated from the WiFi AP 120 by sending a RRC WiFi Termination complete message (RRCWiFi TerminateComplete) to the eNB 1050 at step S920.

Once complete, the downlink PDCP packets are no longer offloaded from the LTE network to the WiFi network for delivery to the UE 1.

Figure 10:
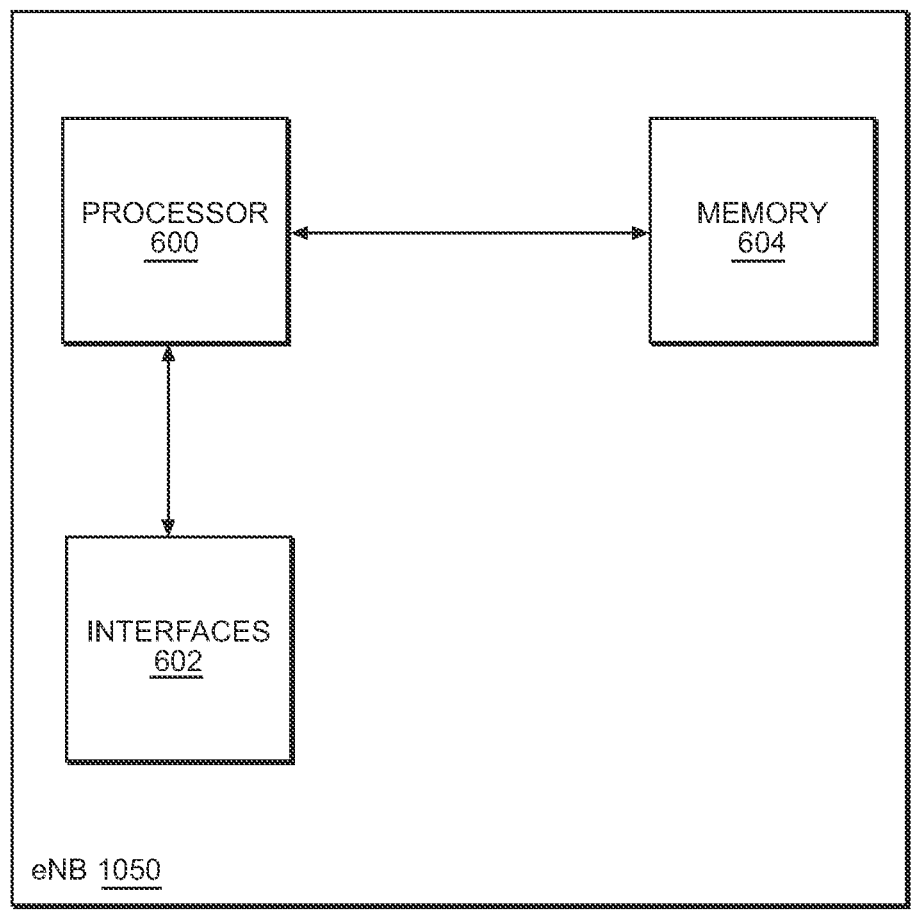
FIG. 10 is a block diagram illustrating example components of a network element according to an example embodiment.

FIG. 10 illustrates example components of a network element according to an example embodiment. For the purposes of description, the network element in FIG. 10 will be assumed to be the small wireless cell 105. However, the description of the components shown in FIG. 10 may also be applicable to other elements of example embodiments, such as WLAN GWs, WiFi APs, UEs, PGWs, SGWs, etc.

As shown, the small wireless cell 105 includes a processor 600, connected to a memory 604 and various interfaces 602. In some embodiments, the small wireless cell 105 may include many more components than those shown in FIG. 10. However, it is not necessary that all of these generally conventional components be shown in order to disclose the illustrative embodiment.

Memory 604 may be a computer readable storage medium that generally includes a random access memory (RAM), read only memory (ROM), and/or a permanent mass storage device, such as a disk drive. Memory 604 also stores an operating system and any other routines/modules/applications for providing the functionalities of the small wireless cell 105, including those discussed herein. These software components may also be loaded from a separate computer readable storage medium into memory 604 using a drive mechanism (not shown). Such separate computer readable storage medium may include a disc, tape, DVD/CD-ROM drive, memory card, or other like computer readable storage medium (not shown). In some embodiments, software components may be loaded into memory 604 via one of the various interfaces 602, rather than via a computer readable storage medium.

Processor 600 may be configured to carry out instructions of a computer program by performing the basic arithmetical, logical, and input/output operations of the system. Instructions may be provided to processor 600 by memory 604.

The various interfaces 602 may include computer hardware components that connect the small wireless cell 105 via a wired or wireless connection to the PGW 103, the SGW 101, WLAN GW 115, the WiFi AP 120, the UE 1, the application/proxy server 110, etc.

As will be understood, the interfaces 602 and programs stored in the memory 604 to set forth the special purpose functionalities of the network element will vary depending on the network element.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

We claim:

1. A radio access network element comprising:
   a base station configured to,
     send an access point addition message to a wireless local area network (WLAN) access point, the access point addition message including a WLAN address for a user equipment, and requesting that the WLAN access point add the WLAN address to a list of user equipments allowed to access a WLAN subsystem identified by a service set identifier (SSID) at the WLAN access point;
     instruct the user equipment to connect to the WLAN subsystem identified by the SSID;
     obtain, from the WLAN access point, a local Internet Protocol (IP) address assigned to the user equipment by the WLAN access point;
     maintain a mapping between the local IP address and a UE session identifier associated with a cellular IP connection for the user equipment;
     allocate, based on received radio link measurement information, at least a first portion of downlink packet data convergence protocol (PDCP) packets received at the base station for delivery to the user equipment over a WLAN link between the user equipment and the WLAN subsystem at the WLAN access point and a second portion of the received downlink PDCP packets for delivery to the user equipment over the cellular IP connection, the received radio link measurement information being indicative of at least one of a WLAN link quality and a loading of the WLAN link; and
     output the first portion of the received downlink PDCP packets to the WLAN access point for delivery to the user equipment over the WLAN link based on the mapping.

2. The radio access network element of claim 1, wherein the base station is further configured to deliver the second portion of the received downlink PDCP packets to the user equipment over the cellular IP connection.

3. The radio access network element of claim 2, wherein the base station is further configured to
   determine a distribution ratio of the first portion of the received downlink PDCP packets to the second portion of the received downlink PDCP packets based on the received radio link measurement information;
   allocate the first portion of the received downlink PDCP packets for delivery to the user equipment over the WLAN link based on the determined distribution ratio; and
   allocate the second portion of the received downlink PDCP packets for delivery to the user equipment over the cellular IP connection based on the determined distribution ratio.

4. The radio access network element of claim 1, wherein:
   the WLAN access point is coupled to the base station by an Internet Protocol (IP) tunnel; and
   the base station is configured to output the first portion of the received downlink PDCP packets to the WLAN access point through the IP tunnel.

5. The radio access network element of claim 4, wherein the IP tunnel is part of an IPSec tunnel between the base station and the user equipment.

6. The radio access network element of claim 4, wherein the WLAN access point and the base station are co-located at the radio access network element.

7. The radio access network element of claim 1, wherein the base station is further configured to
   determine whether the WLAN link for delivering the first portion of the received downlink PDCP packets to the user equipment should be deleted based on updated radio link measurement information received from the user equipment; and
   instruct the user equipment to disassociate from the WLAN access point if the base station determines that the WLAN link should be deleted.

8. The radio access network element of claim 1, wherein the base station is further configured to instruct the WLAN access point to delete the WLAN link if the base station determines that the WLAN link should be deleted.

9. A radio access network element comprising:
   a base station configured to,
     send an access point addition message to a wireless local area network (WLAN) access point associated with a WLAN gateway, the access point addition message including a WLAN address for a user equipment, and requesting that the WLAN access point add the WLAN address to a list of user equipments allowed to access a WLAN subsystem identified by a service set identifier (SSID) at the WLAN access point;
     instruct the user equipment to connect to the WLAN subsystem identified by the SSID;
     obtain, from the WLAN access point, an Internet Protocol (IP) address assigned to the user equipment by the WLAN access point;
     establish a General Packet Radio Service (GPRS) tunneling protocol (GTP) tunnel between the base station and the WLAN gateway;
     maintain a mapping between a UE session identifier associated with a cellular IP connection for the user equipment, the IP address, and a GTP tunnel identifier for the GTP tunnel;
     allocate, based on received radio link measurement information, at least a first portion of downlink packet data convergence protocol (PDCP) packets received at the base station for delivery to the user equipment over a WLAN link between the user equipment and the WLAN subsystem of the WLAN access point and a second portion of the received downlink PDCP packets for delivery to the user equipment over the cellular IP connection, the received radio link measurement information being indicative of at least one of a WLAN link quality and a loading on the WLAN link; and output the first portion of the downlink PDCP packets to the WLAN gateway over the GTP tunnel between the base station and the WLAN gateway for delivery to the user equipment via the WLAN access point over the WLAN link based on the mapping.

10. The radio access network element of claim 9, wherein the base station is further configured to deliver the second portion of the received downlink PDCP packets to the user equipment over the cellular IP connection.

11. The radio access network element of claim 10, wherein the base station is further configured to determine a distribution ratio of the first portion of the received downlink PDCP packets to the second portion of the received downlink PDCP packets based on the radio link measurement information;

allocate the first portion of the received downlink PDCP packets for delivery to the user equipment over the WLAN link based on the determined distribution ratio; and allocate the second portion of the received downlink PDCP packets for delivery to the user equipment over the cellular IP connection based on the determined distribution ratio.

12. The radio access network element of claim 9, wherein the base station is further configured to determine whether the WLAN link for delivering the first portion of the received downlink PDCP packets to the user equipment should be deleted based on updated radio link measurement information from the user equipment; and instruct the user equipment to disassociate from the WLAN access point if the base station determines that the WLAN link should be deleted.

13. The radio access network element of claim 12, wherein the base station is further configured to instruct the WLAN gateway to delete the GTP tunnel if the base station determines that the WLAN link should be deleted.

* * * * *